No. 814,776. PATENTED MAR. 13, 1906.
W. S. FILLEY.
RAILWAY ENGINE SIGNALING DEVICE.
APPLICATION FILED APR. 13, 1905.
3 SHEETS—SHEET 1.
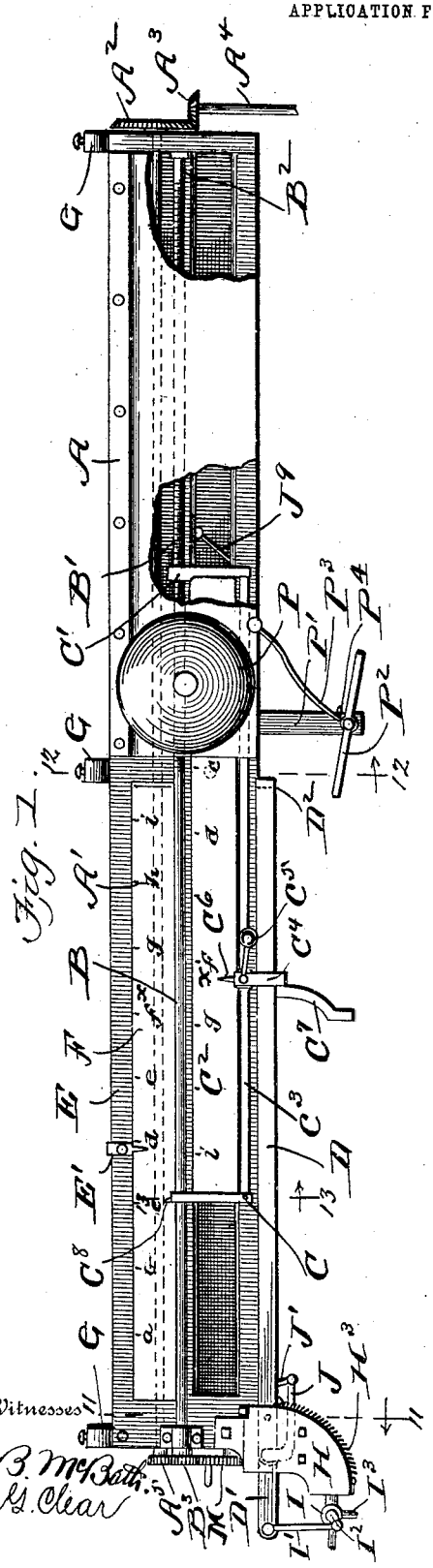
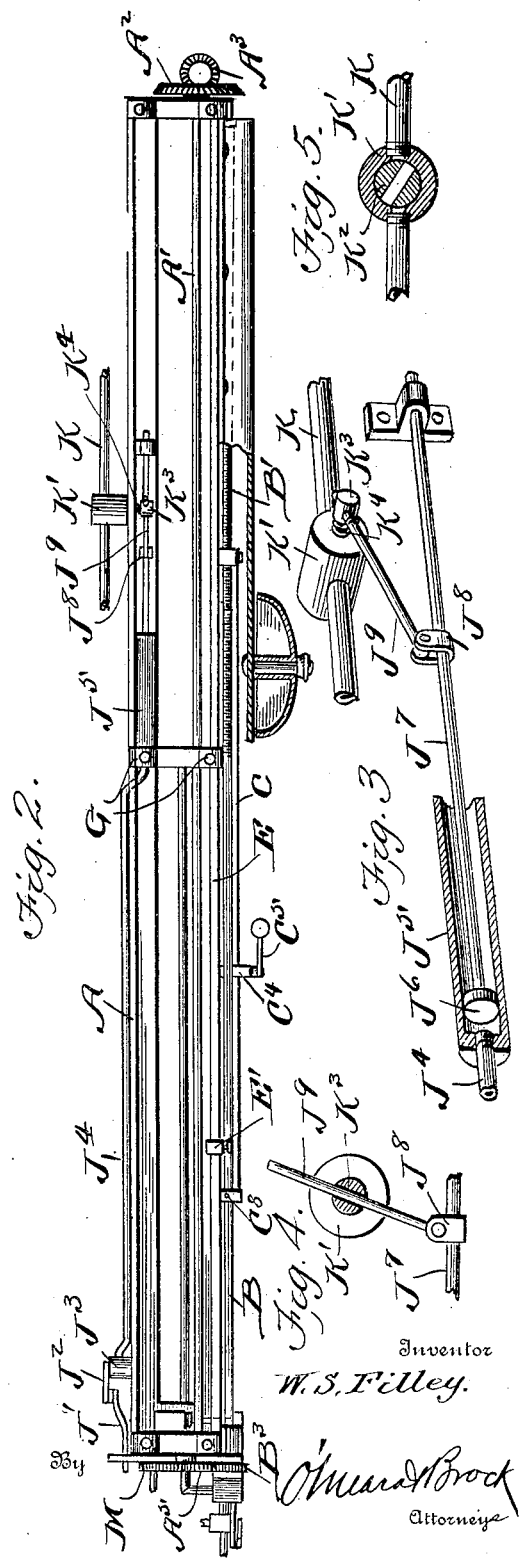
Inventor
W. S. Filley.

No. 814,776. PATENTED MAR. 13, 1906.
W. S. FILLEY.
RAILWAY ENGINE SIGNALING DEVICE.
APPLICATION FILED APR. 13, 1905.
3 SHEETS—SHEET 2.
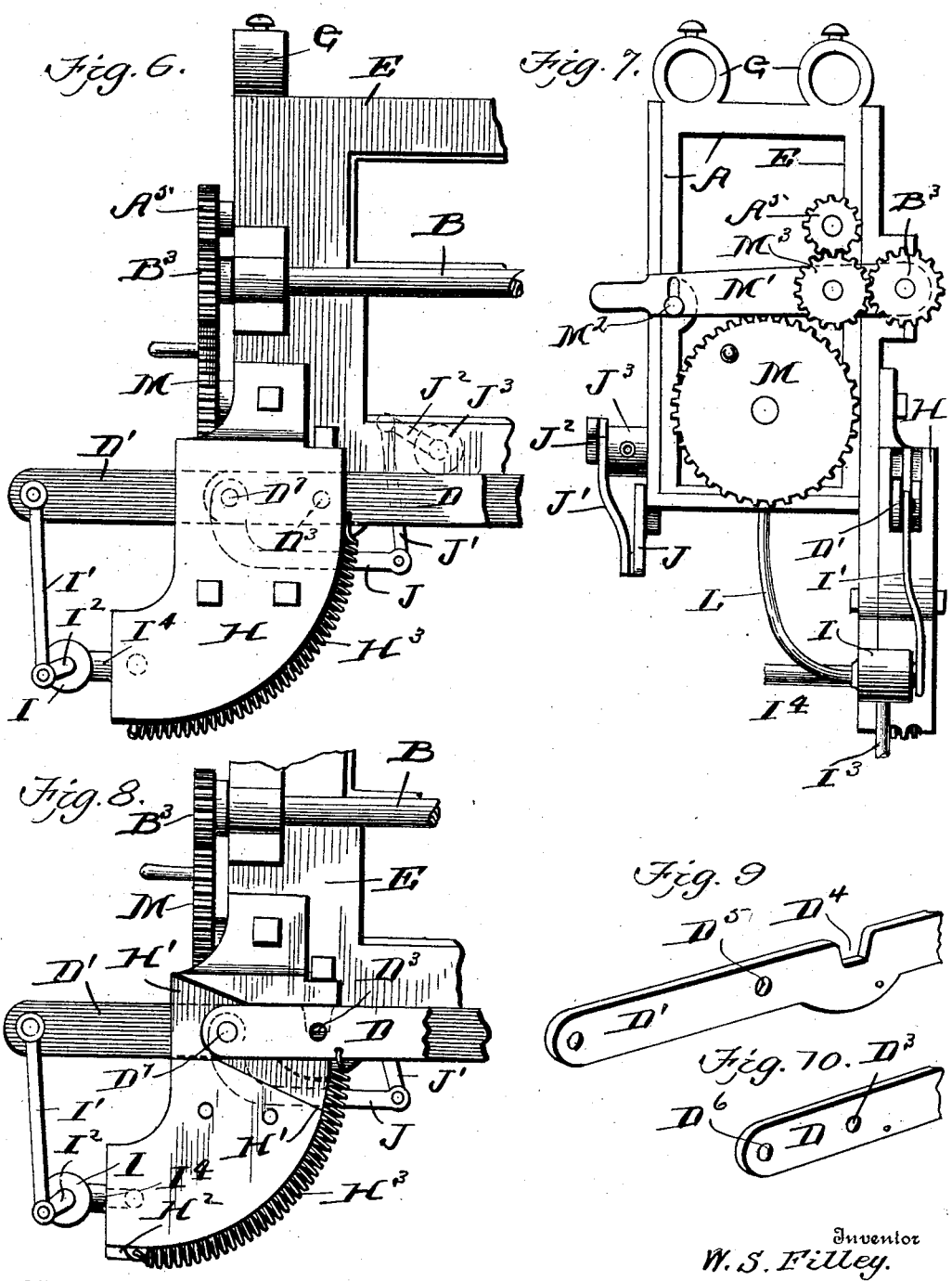
Witnesses
E. B. McBath
M. G. Clear
Inventor
W. S. Filley
By Munn & Brock
Attorneys

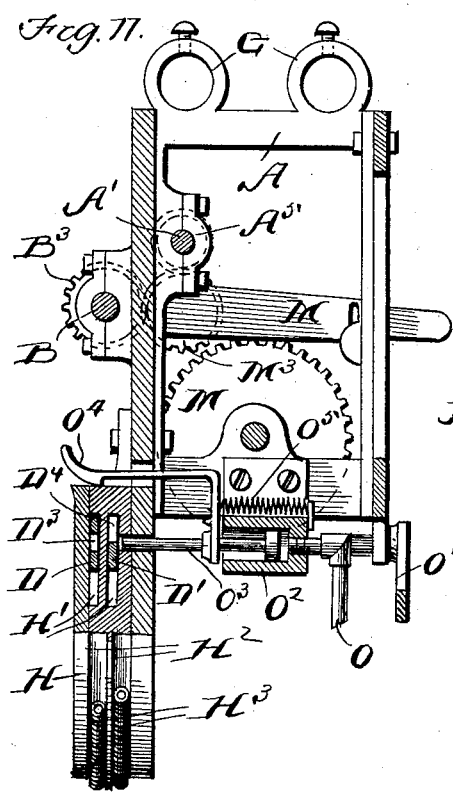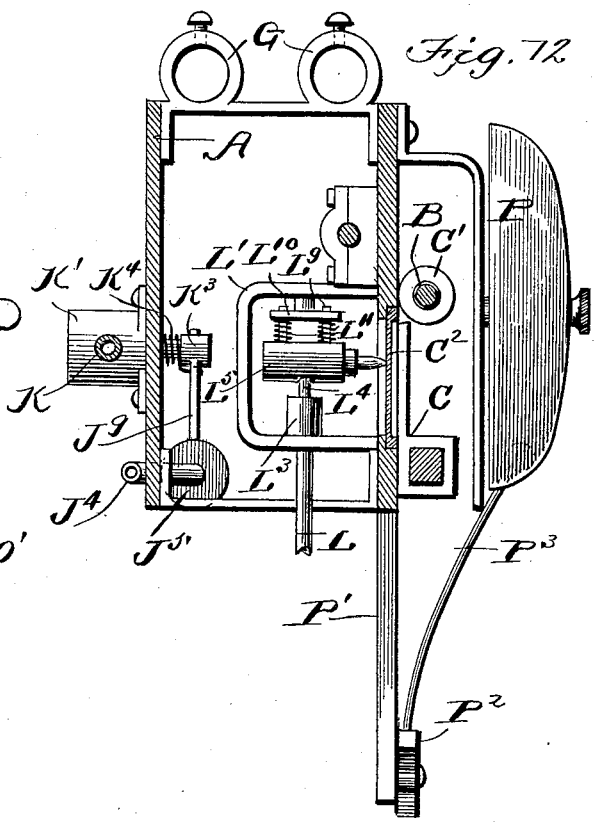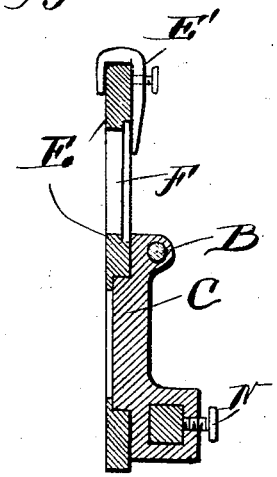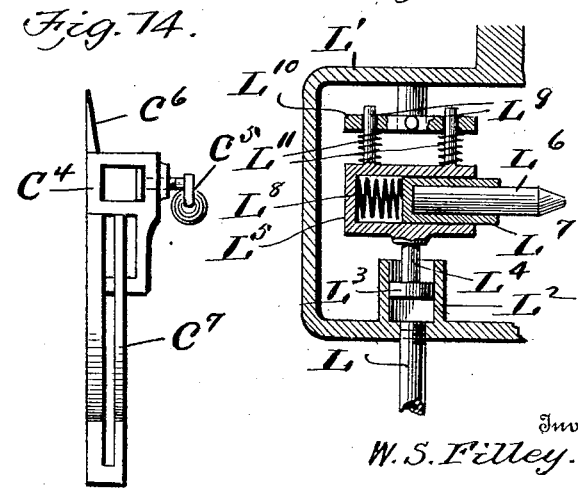

UNITED STATES PATENT OFFICE.

WILLIAM S. FILLEY, OF TOLEDO, OHIO.

RAILWAY-ENGINE-SIGNALING DEVICE.

No. 814,776.　　　　　Specification of Letters Patent.　　　　Patented March 13, 1906.

Application filed April 13, 1905. Serial No. 255,378.

*To all whom it may concern:*

Be it known that I, WILLIAM S. FILLEY, a citizen of the United States, residing at Toledo, in the county of Lucas and State of Ohio, have invented a new and useful Improvement in a Railway-Engine-Signaling Device, of which the following is a specification.

This invention relates to an audible signal-alarm device adapted to be placed in an engine-cab and to sound an alarm when a predetermined point upon the road has been reached and to automatically shut off the steam and stop the engine if the engineer fails to respond to the signal.

A further object is to provide a record of the response of the engineer to the said signal, said recording showing the point on the road where such response was given. Should the engineer pay no attention to the signal, the train is automatically stopped. Should he heed the signal and take proper action to prevent said automatic stoppage, a record will be made of that fact, so that the engineer cannot disregard the signal and subsequently plead that a signal was not given or received by him.

A further object is to actuate the device from an axle of the engine and to provide a pointer movable upon a scale or chart whereby the exact position of the engine at any time may be known by examining the chart.

The invention consists of a fixed chart, a movable chart, said chart being actuated by suitable gearing connecting it with an axle of the engine, a stirrup or hanger traveling with the movable chart, suitable valve-actuating blades pivoted adjacent one end and held in a horizontal position by the hanger, and a pointer carried by the movable chart and adapted to travel on the fixed chart.

The invention also consists of means for sounding an alarm on the fall of one of the blades, of opening an emergency-valve on the subsequent fall of the second blade, and means whereby the engineer can lock the second blade against falling and reset the first.

The invention also consists in the novel features of construction and combination of parts hereinafter described, pointed out in the claims, and shown in the accompanying drawings, in which—

Figure 1 is a face elevation of the complete device as carried within an engine-cab. Fig. 2 is a plan view of the parts shown in Fig. 1. Fig. 3 is a detail perspective view, partly in section, showing the manner of operating a valve in the air train-pipe. Fig. 4 is a detail view, partly in section, of parts shown in Fig. 3. Fig. 5 is a section through the valve operated by the parts shown in Figs. 3 and 4. Fig. 6 is an enlarged detail view of a portion of my device adjacent the forward end, showing a face view in vertical elevation. Fig. 7 is an elevation of the forward end of the device. Fig. 8 is an enlarged face view of the lower portion of Fig. 6, the outer plate of a hanger being removed. Fig. 9 is a detail perspective view of the pivoted end of the signal-sounding blade. Fig. 10 is a similar view of the emergency-blade. Fig. 11 is a section on the line 11 11 of Fig. 1. Fig. 12 is a section on the line 12 12 of Fig. 1. Fig. 13 is a section on the line 13 13 of Fig. 1. Fig. 14 is a detail end view of a hanger. Fig. 15 is a detail sectional view showing in elevation the pencil for recording fall of the signal-blade and the valve for actuating the pencil.

In the drawings, A represents a suitable casing adapted to be placed in an engine-cab and closed in front toward its rear end and open adjacent the forward end, the latter being that toward the engineer and the end at which the device is properly set and otherwise manipulated. Through the casing extends a shaft A', which at one end carries a gear-wheel A², meshing with a beveled gear-wheel A³, carried at the upper end of a shaft A⁴. The shaft A⁴ is driven, preferably, from an axle of the forward truck in any desired manner, the only essential point being that there should be no change of speed between the truck and shaft A⁴ by any variable form of gearing and that the speed of the gear A² must be in a known proportion to the speed of rotation of the axle and the diameter of the wheels of the said axle. At the opposite end of the shaft, termed the "forward end," is a gear-wheel A⁵. A rod B is journaled in the casing A parallel to the shaft A' and has a rear threaded portion B'; but the extreme rear end portion is left smooth, as shown at B². A gear-wheel B³ is carried by the rod B, adapted to mesh with the gear A⁵ through the medium of an intermediate gear to be described hereinafter. Within the casing A is a frame C, adapted to travel along the rod B, being suspended from the said rod, and the end member C' of the frame in engagement with the threaded portion B' of the rod B is threaded, and when the rod B is rotated the frame C is thereby advanced along the rod, the direction of travel of the frame depending on the direction of rotation of the rod B. The frame C carries a chart $C^2$, which travels with the frame. On the lower horizontal member of the frame C is slidably secured a hanger or stirrup $C^4$, which is locked in its adjusted position by a lock-nut actuated by a weighted handle $C^5$. The hanger is provided with a pointer $C^6$. The hanger is adapted to receive and support the free end portions of pivoted blades D and D', spaced from each other in the hanger, and the hanger carries a depending guide-loop $C^7$, adapted to guide the signal-blade D' as it falls. At its forward end the frame C carries a pointer $C^8$, adapted to travel along a fixed chart F.

The emergency-blade D and signal-blade D' are pivoted in a hanger H, placed on the side of the casing A adjacent its forward end, the free end of the blade D' terminating in advance of the free end of the blade D, and as the hanger moves rearwardly the signal-blade D' will fall first, being first deprived of the support of the hanger $C^4$, and in its fall will be guided by the depending loop $C^7$, which is suitably curved to conform to the arc described by the free end of the blade D'. This blade has a notch $D^4$ formed adjacent its pivoted end, and the notch alines with an aperture $D^3$, formed in the blade D. An aperture $D^5$ is also formed in the blade D', which alines with an aperture $D^6$, formed in the blade D, and it will be noted that the signal-blade D' extends in advance of the hanger H and end of the casing A, being of greater length than the blade D. A pivot-pin $D^7$ is passed loosely through the hanger H, which will be described in detail hereinafter, and is non-rotatably secured in the aperture $D^6$ of the blade D and passes loosely through the blade D' at the aperture $D^5$, serving as a pivot-pin for the said blade D'.

A vertical partition E is placed in the casing A immediately to the rear with respect to the front of the casing of the rod B, and a pointer E' is slidably carried by the upper edge of the partition E, this pointer being adapted to travel along the fixed chart F, heretofore mentioned, which chart is carried by the front face of the partition E.

While the casing A may be secured in the cab in any manner, I prefer to provide it with a plurality of rings G, so that the casing may be suspended from a rod or pipe. (Not shown.)

The hanger H is in the form of a segment and is provided with angled slots H', intersected by the pivot-pin $D^7$, and through these slots the blades D and D' pass, the angling of the walls of the slots, as shown in Fig. 8, permitting play of the blades on their pivot-points. The curved edge or face of the hanger H is provided with two parallel grooves $H^2$, in which rest coil-springs $H^3$, secured at their lower ends to the hanger H and at their upper ends to the blades D and D', respectively.

To the inner end of the pivot-pin $D^7$, which, it will be remembered, is rigid with the blade D and which passes loosely through the signal-blade D', is rigidly secured a curved arm J, to the free end of which is pivoted a link J', having its remaining end pivotally connected to an arm $J^2$, rigidly connected in its turn to an emergency-valve $J^3$. It will be obvious, therefore, that the fall of the emergency-blade D will through these connections actuate the valve $J^3$, and that so far as the operation and construction of the parts heretofore described are concerned it is immaterial whether the valve $J^3$ serves to cut off steam and bring the engine to a stop or serves to set the air-brakes, and thus check the speed of the train.

For illustrative purposes I have shown the connections whereby the fall of the emergency-blade D will open the train-pipe and permit the air to escape therefrom. From the valve $J^3$, which is a three-way valve, a pipe $J^4$ extends to a cylinder $J^5$, in which is a piston $J^6$ and a piston-rod $J^7$, the rod $J^7$ reciprocating parallel to the train-pipe K, in which is placed a one-way valve $K^2$, having a stem enlarged, as shown at $K^3$, and apertured. A U-shaped clip $J^8$ is fastened to the piston-rod $J^7$, and a link $J^9$ is pivoted in the clip and works freely through the aperture in the enlarged portion $K^3$ of the stem of the valve $K^2$. A coil-spring $K^4$ returns the valve to its closed or normal position when the valve $J^3$ is thrown to its normal position by the replacing of the blade D in the hanger $C^4$, permitting air to escape from the cylinder $J^5$. To record the fall of the signal-blade D', I provide a three-way valve I, the stem of which is operated by links I' and $I^2$, pivotally connecting the valve-stem to the blade D', as shown in Figs. 1, 6, 7, and 8. This valve normally registers with an exhaust-pipe $I^3$, but on being actuated by the fall of the blade D' closes the exhaust and places a pipe $I^4$, leading to an air-reservoir (not shown) in communication with a pipe L. The pipe L leads to a cylinder $L^2$, placed vertically in a frame L', and in the cylinder works a piston $L^3$, having a piston-rod $L^4$, which at its upper end supports a cylinder $L^5$ at a right angle to the cylinder $L^3$.

A sheath $L^7$, movable in the cylinder $L^5$, carries a pencil $L^6$, held by a spring $L^8$ in engagement with the back of the movable chart $C^2$. The upper side of the cylinder $L^5$ carries vertical guide-rods $L^9$, working through apertures in a plate $L^{10}$, and coil-springs $L^{11}$, which encircle the rods $L^9$, serve to hold the pencil in its normal horizontal plane.

In order that the apparatus may be reset after the carrier or frame C has traveled its full limit on the rod B, I provide a hand-rotated gear-wheel M at the forward end of the casing A and a pivoted lever M', locked in its adjusted position by a set-screw M². The lever carries a gear M³, meshing in all positions of the lever with the gear-wheel B³ and in the normal position of the lever with the gear-wheel A⁵. By shifting the lever the gear-wheel M³ is engaged with the gear-wheel M and rotation of the said wheel by hand will rotate the gear-wheel B³ and the rod B, thus returning the frame C to its starting-point.

The ends of the frame C are detachable from the lower horizontal member of the frame, and the front end or non-threaded end member is locked in place with a set-screw N, as shown most clearly in Fig. 13, thus permitting ready removal of one chart and the substitution of another.

To prevent the fall of the emergency-blade after the signal-blade has been dropped and the signal heeded by the engineer, a pipe O is connected with a suitable air-reservoir and contains a valve actuated by a handle O' is within reach of the engineer. By opening this valve air is admitted into a cylinder O², in which works a piston-rod O³, which serves as a lock-pin and enters the aperture D³ in the blade D', passing through the notch D⁴ in the signal-blade; but it will be obvious that when the signal-blade D' is in its normal position supported by the hanger C⁴ that the locking-pin O³ is prevented from passing the blade D', and the blade D can therefore be locked by the engineer only when the blade D' is down, and it will be remembered that the fall of the signal-blade will leave a pencil record on the back of the chart showing such fall. The locking-pin O³ carries a spring-catch O⁴, which engages the upper edge of the hanger H when the blade D is locked and prevents return of the pin to its normal position until after the catch is disengaged, which can be readily done with the thumb. A spring O⁵ will then return the pin O³ to its normal position and unlock the emergency-blade. The signal-blade D' can then be returned to its normal position.

To give an audible signal on the fall of the blade D', I provide a gong P and a bracket P', to which is pivoted a lever P². A clapper P³ is carried by the lever P², and movement of the lever is limited by a stop P⁴. An end portion of the lever is in the path of the free end of the signal-blade D', and the guide C⁷ insures that the blade strikes the lever on its fall, thus actuating the clapper and sounding the gong.

The charts C² and F are provided with scales representing miles and fractions of a mile and with the names of stations, sidings, &c. I have represented these latter in Fig. 1 and designated them $a\ b\ c$, &c., and for convenience of illustration have shown them as being equidistant from each other. It will be noted that the scale of one chart is reverse with respect to that of the other.

The operation of the device is as follows: Assuming that the engineer has orders to take a siding at a certain point $x$ beyond $f$, the hanger C⁴ is set at the point $x$ on chart C⁴ and locked in such position by the lock C⁵. The chart C² is then brought into proper position by the engineer by rotation of the gear-wheel M—that is, assuming, again, that the engineer receives his orders at $c$ to take the siding at $x$, he moves the chart C² and frame C until the pointer C⁸ registers with $c$, his starting-point, on the fixed chart F. The gear-wheel M³ is then locked in engagement with the gear-wheel A⁵, and the rotation of the rod B will cause the chart to travel along the same and the pointer C⁸ along the chart F in the direction of $x$. When the pointer C⁸ reaches $x$, which may be taken as indicating not the siding itself, but a point on the road in advance of the siding where the signal is to be sounded, the hanger C⁴ will have reached the free end of the signal-blade D' and passing from under the same will permit it to fall, and the fall of the blade will sound the gong by reason of the blade striking the lever P². The fall of the blade will also through the valve I admit air into the cylinder L² through the pipe L, and the piston L³ will move upward, carrying the pencil L⁶ with it, thus breaking the straight line made on the back of the chart from $c$ to $x$. On hearing the alarm the engineer can prevent the fall of the emergency-blade by moving the valve-handle O' and admitting air into the cylinder O², forcing the pin O³ through the notch D⁴ of the blade D', which notch is brought into alinement with the pin by fall of the blade, and the pin entering the aperture D³ will lock the blade D and prevent its falling when the hanger C⁴ has been carried beyond it. The engineer can then bring the train to a stop to take the siding and can reset the device. It will be noted that during the time between the fall of the signal-blade D' and the stoppage of the engine the pencil L⁶ is held above its normal position and is making a record on the back of the chart which will show the exact distance run by the engine from the time the blade D' fell to the time the engine came to a standstill, as the length of any line drawn by the pencil on the chart will be in a definite proportion to the distance traveled by the engine while such line was being made without regard to the speed of the engine, as the controlling factor is the number of revolutions made by the axle of the engine with which the gearing is connected and as a matter of course the diameter of the wheels on such axle.

Should the engineer for any reason fail to hear or heed the signal, the emergency-blade D will fall after a predetermined distance has been run, such distance being fixed by the lead or extra length given the blade D, and the emergency-valve J³ will be thereby opened and the brakes applied or the steam cut off, according as the said valve may be connected to the air-brake system or the throttle-valve.

When the blades are reset, the parts are returned to their normal positions, including the pencil $L^6$, the lifting of the blade permitting the air in the cylinder $L^3$ to exhaust through the pipe $I^3$ and the springs $L^{11}$ aiding in returning the cylinder $L^3$ to its normal position.

To avoid any confusion in the drawings, no parts of the air-brake system proper are shown, nor are the throttle-valve or parts of the engine itself shown, as none of these are of my invention.

Having thus fully described my invention, what I claim as new, and desire to secure by Letters Patent, is—

1. A device of the kind described comprising a fixed and a movable chart, a pointer carried by the movable chart, a hanger carried by the movable chart and movable with reference thereto, a pivoted signal-blade adapted to be supported by the hanger and to fall when the hanger has traveled a predetermined distance in unison with the movable chart, and means for moving the movable chart and hanger at a speed proportion to the speed of a train.

2. A device of the kind described comprising a fixed scale, a movable frame carrying a scale corresponding to the fixed scale, a pointer on the frame adapted to travel on the fixed scale, a movable hanger on the frame, means for locking the hanger in position on the frame, a pivoted blade adapted to have its free end in engagement with the hanger, and means for moving the frame and hanger in a direction away from the pivotal point of the blade.

3. A device of the kind described comprising a fixed scale, a frame carrying a movable scale, said scale reading in reverse direction from that of the fixed scale, a pointer carried by the frame and adapted to travel along the fixed scale, a movable pointer on the frame, means for moving the frame at a speed proportional to the distance traveled by an engine, and means for giving an alarm when the pointer on the frame reaches a point on the fixed scale corresponding to the point on the movable scale for which the pointer carried by the frame is set.

4. A device of the kind described comprising a fixed scale, a movable frame having a pointer adapted to travel on the fixed scale and carrying a similar scale, a hanger movable on the frame along the scale last mentioned, means for locking the hanger in position, a signal-blade pivoted adjacent one end, an emergency-blade parallel to the signal-blade and pivoted adjacent one end, the free end portions of the blades being normally supported by the hanger, the free end portion of the signal-blade being shorter than that of the emergency-blade, an alarm adapted to be actuated by fall of the signal-blade, and a valve adapted to set the train-brakes adapted to be operated by the fall of the emergency-blade.

5. A device of the kind described comprising a chart, a frame adapted to move along said chart and carrying a similar chart reading in reverse direction, a movable hanger on the frame, a pivoted blade having its free end portion normally supported by the hanger, means for moving the frame at a speed proportional to that of an engine, an alarm adapted to be sounded by fall of the said blade, a printing implement adapted to bear on the movable chart, and means for moving the said implement on the fall of the blade, as and for the purpose set forth.

WILLIAM S. FILLEY.

Witnesses:
W. W. CHAMBERLIN,
R. E. HOOD.